(12) United States Patent
Gwak et al.

(10) Patent No.: US 11,893,157 B2
(45) Date of Patent: *Feb. 6, 2024

(54) DEVICE FOR PROVIDING TACTILE STIMULATION

(71) Applicant: BHAPTICS INC., Daejeon (KR)

(72) Inventors: Ki Uk Gwak, Daejeon (KR); Bo Gyeong Kim, Daejeon (KR)

(73) Assignee: BHAPTICS INC., Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/948,293

(22) Filed: Sep. 20, 2022

(65) Prior Publication Data

US 2023/0017719 A1 Jan. 19, 2023

Related U.S. Application Data

(62) Division of application No. 17/209,729, filed on Mar. 23, 2021, now Pat. No. 11,513,599, which is a division of application No. 16/318,334, filed as application No. PCT/KR2017/008251 on Jul. 31, 2017, now Pat. No. 10,990,178.

(30) Foreign Application Priority Data

Aug. 2, 2016 (KR) .................. 10-2016-0098572

(51) Int. Cl.
G09G 5/00 (2006.01)
G06F 3/01 (2006.01)
G08B 6/00 (2006.01)
G06F 3/048 (2013.01)

(52) U.S. Cl.
CPC ............... *G06F 3/016* (2013.01); *G06F 3/01* (2013.01); *G08B 6/00* (2013.01); *G06F 3/048* (2013.01)

(58) Field of Classification Search
CPC . G06F 1/163; G06F 3/01; G06F 3/014; G06F 3/016; G06F 3/048; G08B 6/00
See application file for complete search history.

(56) References Cited

U.S. PATENT DOCUMENTS

2015/0294597 A1* 10/2015 Rizzo ..................... A61H 3/061
340/4.12
2017/0221324 A1* 8/2017 Kawaguchi ......... H04M 19/047

* cited by examiner

*Primary Examiner* — Insa Sadio
(74) *Attorney, Agent, or Firm* — IP & T GROUP LLP

(57) ABSTRACT

A tactile stimulation providing apparatus includes a plurality of actuators and a plurality of actuator cases respectively corresponding to the plurality of actuators. Each of the actuator cases includes: a cap covering an upper portion of a corresponding actuator; and a base covering a lower portion of the actuator, the base being connected to the cap to fix the actuator.

14 Claims, 10 Drawing Sheets

DEVICE FOR PROVIDING TACTILE STIMULATION

CROSS-REFERENCE TO RELATED APPLICATION(S)

This application is a division of U.S. patent application Ser. No. 17/209,729 filed on Mar. 23, 2021, which is a division of U.S. patent application Ser. No. 16/318,334 filed on Jan. 16, 2019 and issued as U.S. Pat. No. 10,990,178 on Apr. 27, 2021. The '334 application is a national stage application of PCT/KR2017/008251 filed on Jul. 31, 2017, which claims priority of Korean patent application number 10-2016-0098572 filed on Aug. 2, 2016. The disclosure of each of the foregoing application is incorporated herein by reference in its entirety.

TECHNICAL FIELD

The present invention relates a tactile stimulation providing apparatus.

BACKGROUND ART

A tactile stimulation providing apparatus includes a plurality of actuators, and selectively vibrates the plurality of actuators, thereby providing a tactile stimulation to a user.

Prior Document 1 (U.S. Patent Publication No. 2015-0123774, May 7, 2015) discloses a tactile stimulation providing apparatus in the form of a chair. In Prior Document 1, the tactile stimulation providing apparatus generates an active pattern by detecting a sound, and applies the active pattern to a plurality of vibrating motors, thereby providing a tactile stimulation to a user. The vibrating motor corresponds to an actuator.

Referring to FIG. 1 of Prior Document 1, the tactile stimulation providing apparatus includes six vibrating motors. Referring to FIG. 6 of Prior Document 1, there is illustrated a sectional view in the vicinity of each vibrating motor. Also, the tactile stimulation providing apparatus additionally includes six voice coil motors that are devices for transferring vibrations to a user, such as the vibrating motors. Referring to FIGS. 7 and 8 of Prior Document 1, there is illustrated a sectional view in the vicinity of each voice coil motor.

Referring to FIG. 6 of Prior Document 1, the bottom of the vibrating motor is adhered to a hard foam, the side of the vibrating motor is fixed to a soft foam while being surrounded by the soft foam, and the top of the vibrating motor is covered with a pad front cover.

Since the foams around the vibrating motor absorb a vibration, this structure is applicable only when the size and strength of the vibrating motor is large. When the vibrating motors are arranged at a sufficient distance, the user can distinguish vibrations of the individual vibrating motors from one another. On the other hand, when the vibrating motors are densely arranged, the user has difficulty in distinguishing vibrations of the individual vibrating motors from one another due to a somewhat large size and strong vibration of the vibrating motor. Therefore, it is difficult to provide a tactile stimulation having high resolution.

Referring to FIGS. 7 and 8 of Prior Document 1, the voice coil motors having a size and a vibration strength, which are somewhat smaller than those of the vibrating motors, are not directly fixed to the hard foam but fixed to an acryl plate, to be surrounded by the hard foam and the soft foam.

Since a vibration is less absorbed than a case where the voice coil motor is in direct contact with the foam, this structure is applicable to a motor having a relatively small vibration strength, and thus motors can be more densely arranged. However, as a vibration of an individual motor is transferred to a place at which other motors around the individual motor exist through the acryl plate, it is difficult to distinguish vibrations of the individual motors from one another. Therefore, it is still difficult to provide a tactile stimulation having high resolution.

In addition, the local transfer of a vibration has a deep correlation with the degree of close contact between the tactile stimulation providing apparatus and a body of a user. However, Prior Document 1 is problematic in that a solution for allowing the tactile stimulation providing apparatus to be in close contact with the body of the user is not proposed.

Technical Problem

Accordingly, an object of the present invention is to provide a tactile stimulation providing apparatus capable of allowing a user to easily distinguish outputs of a plurality of actuators from one another even when the plurality of actuators are densely arranged, being adhered closely to a body of the user, and allowing each actuator to move freely.

Technical Solution

According to an aspect of the present invention, there is provided a tactile stimulation providing apparatus including a plurality of actuators and a plurality of actuator cases respectively corresponding to the plurality of actuators, wherein each of the actuator cases includes: a cap covering an upper portion of a corresponding actuator; and a base covering a lower portion of the actuator, the base being connected to the cap to fix the actuator.

The tactile stimulation providing apparatus may further include a plurality of module cases each including at least one of the actuator cases. The base of the actuator case may be exposed to the outside through an opening formed in a lower surface of a corresponding module case.

The cap of the actuator case may be connected to an upper surface of the corresponding module case with a first elastic member interposed therebetween, and the base of the actuator case may be connected to the lower surface of the corresponding module case with a second elastic member interposed therebetween.

Each of the module cases may include two of the actuator cases, which are disposed in a first direction. The actuator case may include side openings located in a second direction orthogonal to the first direction.

Each of the module cases may include a first wiring passage extending in the second direction through the side openings. The module case may share the first wiring passage with an adjacent module case, to be connected to the adjacent module case.

The tactile stimulation providing apparatus may further include a controller for controlling driving of the plurality of actuators. The controller may be electrically connected to the plurality of actuators through the first wiring passage.

Two module cases among the plurality of module cases may be connected to each other by sharing a second wiring passage extending in the first direction.

The two module cases may be connected to each other through a hinge.

Each of the actuator cases may include at least one insertion hole at a side thereof.

The tactile stimulation providing apparatus may further include a plurality of tubes. Each of the actuator cases may share a tube fixed to the insertion hole with an adjacent actuator case, to be connected to the adjacent actuator case.

The tactile stimulation providing apparatus may further include a controller for controlling driving of the plurality of actuators. The controller may be electrically connected to the plurality of actuators through the plurality of tubes.

Each of the actuator cases may include an actuator accommodating space formed in the base. The cap may include a tube accommodating space at the center thereof, and include at least one insertion holes connected to the tube accommodating space at a side thereof.

The tactile stimulation providing apparatus may further include a grid-shaped tube structure extending in a third direction and a fourth direction orthogonal to the third direction. The tube accommodating space and the insertion hole may be engaged with the tube structure at a corresponding grid intersection point, so that the position of each of the actuator cases with respect to the tube structure is fixed.

The tactile stimulation providing apparatus may further include a controller for controlling driving of the plurality of actuators. The controller may be electrically connected to the plurality of actuators through the tube structure.

Advantageous Effects

The tactile stimulation providing apparatus according to the present invention can allow a user to easily distinguish outputs of a plurality of actuators from one another even when the plurality of actuators are densely arranged, be adhered closely to a body of the user, and allow each actuator to move freely.

MODE FOR THE INVENTION

Figure 1:
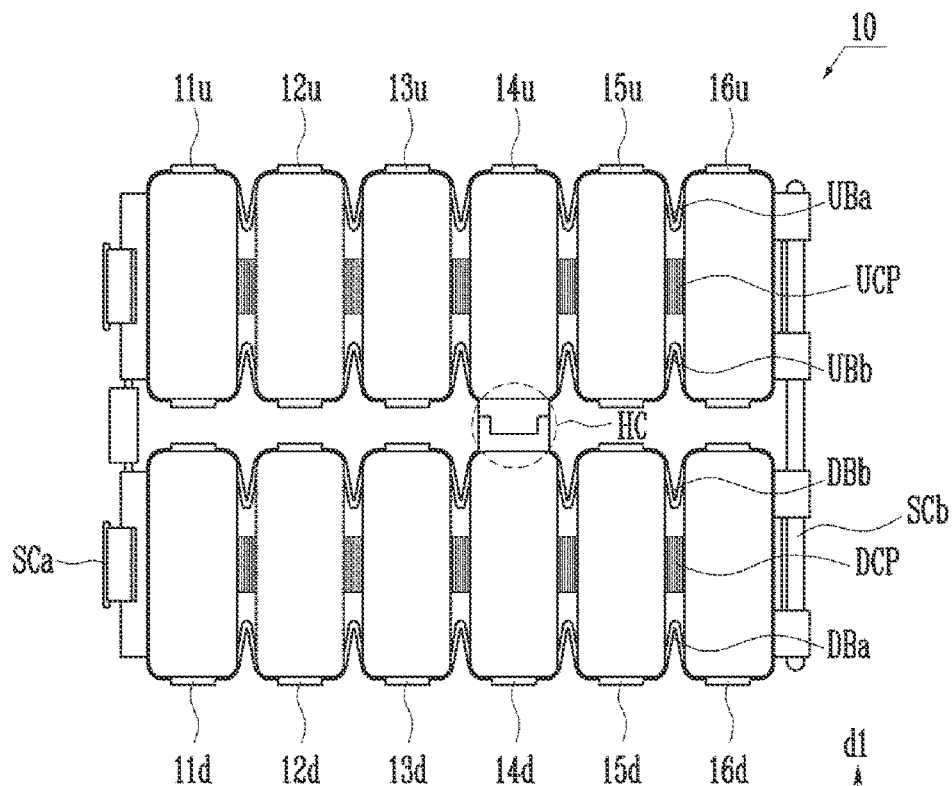
FIG. 1 is a view illustrating a tactile stimulation providing apparatus according to a first embodiment of the present invention.

Hereinafter, exemplary embodiments are described in detail with reference to the accompanying drawings so that those skilled in the art may easily practice the present invention. The present invention may be implemented in various different forms and is not limited to the exemplary embodiments described in the present specification.

A part irrelevant to the description will be omitted to clearly describe the present invention, and the same or similar constituent elements will be designated by the same reference numerals throughout the specification. Therefore, the same reference numerals may be used in different drawings to identify the same or similar elements.

In addition, the size and thickness of each component illustrated in the drawings are arbitrarily shown for better understanding and ease of description, but the present invention is not limited thereto. Thicknesses of several portions and regions are exaggerated for clear expressions.

FIG. 1 is a view illustrating a tactile stimulation providing apparatus according to a first embodiment of the present invention.

Referring to FIG. 1, the tactile stimulation providing apparatus 10 according to the first embodiment of the present invention includes a plurality of module cases 11$u$, 12$u$, 13$u$, 14$u$, 15$u$, 16$u$, 11$d$, 12$d$, 13$d$, 14$d$, 15$d$, and 16$d$. Each module case may be made of one or more rigid materials including plastic, metal, and the like.

The plurality of module cases may include module cases 11$u$, 12$u$, 13$u$, 14$u$, 15$u$, and 16$u$ of a first row, which are arranged in a second direction d2, and module cases 11$d$, 12$d$, 13$d$, 14$d$, 15$d$, and 16$d$ of a second row, which are arranged in parallel to the first row. Each module case includes at least one actuator case and an actuator corresponding to the actuator case.

The module cases 11$u$, 12$u$, 13$u$, 14$u$, 15$u$, and 16$u$ of the first row share bands UBa and UBb by allowing the bands UBa and UBb to be inserted thereinto at sides thereof. Thus, the module cases 11$u$, 12$u$, 13$u$, 14$u$, 15$u$, and 16$u$ of the first row can be flexibly connected to each other. The bands UBa and UBb may be implemented with an elastic band or a non-elastic band being folded in advance. When the bands UBa and UBb are implemented with the elastic band, the bands UBa and UBb may be configured with one or more bands having flexibility, which include a fabric band, a rubber band, a spring band. When the bands UBa and UBb are implemented with the non-elastic band, the bands UBa and UBb may be made of a material such as urethane.

Also, the module cases 11$u$, 12$u$, 13$u$, 14$u$, 15$u$, and 16$u$ of the first row may share a wiring passage UCP extending in the second direction d2 through side openings thereof.

The wiring passage UCP may include therein a wiring that electrically connects a plurality of actuators and a controller for controlling driving of the plurality of actuators. The wiring may be provided in the form of a wire or be provided in the form of a Flexible Printed Circuit Board (FPCB).

The wiring passage UCP may have insufficient flexibility as compared with the bands UBa and UBb, and hence the length of the wiring passage UCP may be determined to be sufficient corresponding to the expected extension length of the bands UBa and UBb. The wiring passage UCP may be provided in a shape having a plurality of wrinkles. A bellows structure may be used as one shape having a plurality of wrinkles.

The module cases 11d, 12d, 13d, 14d, 15d, and 16d of the second row share bands DBa and DBb by allowing the bands DBa and DBb to be inserted thereinto at sides thereof. Thus, the module cases 11d, 12d, 13d, 14d, 15d, and 16d of the second row can be flexibly connected to each other. Also, the module cases 11d, 12d, 13d, 14d, 15d, and 16d of the second row may share a wiring passage DCP extending in the second direction d2 through side openings thereof. Like the above-described bands UBa and UBb, the bands DBa and DBb may be implemented with an elastic band or a non-elastic band.

Like the wiring passage UCP, the wiring passage DCP may include therein a wiring that electrically connects a plurality of actuators and a controller. The wirings in the wiring passages UCP and DCP may be connected to a common controller. The controller may be located in any one of the plurality of module cases. For example, two module cases 14u and 14d may share a wiring passage extending in a first direction d1. Accordingly, although the controller exists in any one module case, the controller can control driving of all the actuators through the wiring passages extending in the first direction d1 and the second direction d2. The wiring passage extending in the second direction d2 may be formed inside or near a hinge HC that connects the module cases 14u and 14d.

The tactile stimulation providing apparatus 10 may include fastening parts SCa and SCb fastenable to each other at both ends thereof in the second direction d2. The fastening parts SCa and SCb may be configured as a pair of male and female rings. In addition, the fastening parts SCa and SCb may be configured using at least one existing fastening member including a hook, a Velcro, a zipper, a clip, a button, a strap, a magnet, and the like.

Figure 2:
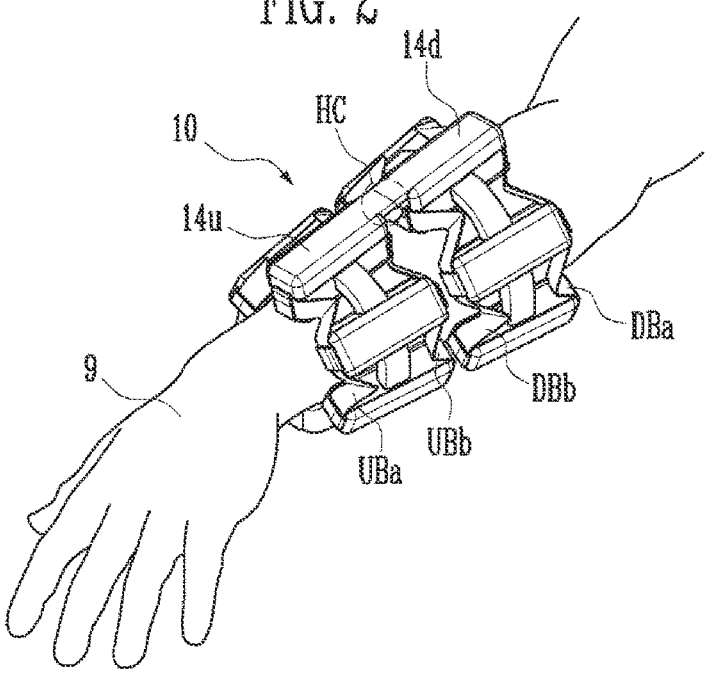
FIG. 2 is a view illustrating the tactile stimulation providing apparatus mounted around an arm of a user according to the first embodiment of the present invention.

FIG. 2 is a view illustrating the tactile stimulation providing apparatus mounted around a body of a user according to the first embodiment of the present invention.

Referring to FIG. 2, the tactile stimulation providing apparatus 10 according to the first embodiment of the present invention, which is mounted around a body 9 of a user is illustrated. The fastening parts SCa and SCb may be in a state in which the fastening parts SCa and SCb are fastened to each other.

As the thickness of the body 9 of the user increases, the folded bands UBa, UBb, DBb, and DBa are unfolded, so that the bands UBa, UBb, DBb, and DBa may be stretched. The plurality of module cases are adhered closely to the body 9 of the user according to the flexibility of the bands UBa, UBb, DBb, and DBa, and the actuator cases protruding from the module cases are also adhered closely to the body 9 of the user.

As will be described later, the tactile stimulation providing apparatus 10 according to the first embodiment may include two actuator cases for each module case. The module case is supported from the body 9 of the user through the two actuator cases, and thus a vibration of each actuator can be wholly transferred to the body 9 of the user.

When one module case includes three or more actuator cases, some of the actuator cases may not be adhered closely to the body 9 of the user. For example, this is because there may occur a case where the module case are wholly supported from the body 9 of the user through arbitrary two actuator cases without close adhesion of another actuator case due to winding of the body 9. Therefore, the tactile stimulation providing apparatus 10 according to the first embodiment preferably includes two actuators disposed in the first direction d1 for each module case. The distance between the centers of the two actuator cases may be determined as 3 to 4 cm.

In addition, when the module case includes only two actuator cases, the length of the module case may be sufficiently shortened. When the length of the module case is sufficiently short, a separate member corresponding to the winding of the body 9 of the user may not be included in the module case.

However, the module case 14u and the module case 14d include a separate member called as the hinge HC, to correspond to the winding of the body 9 of the user in spite of a total of four actuator cases. The hinge HC will be described in detail with reference to FIG. 5.

Figure 3:
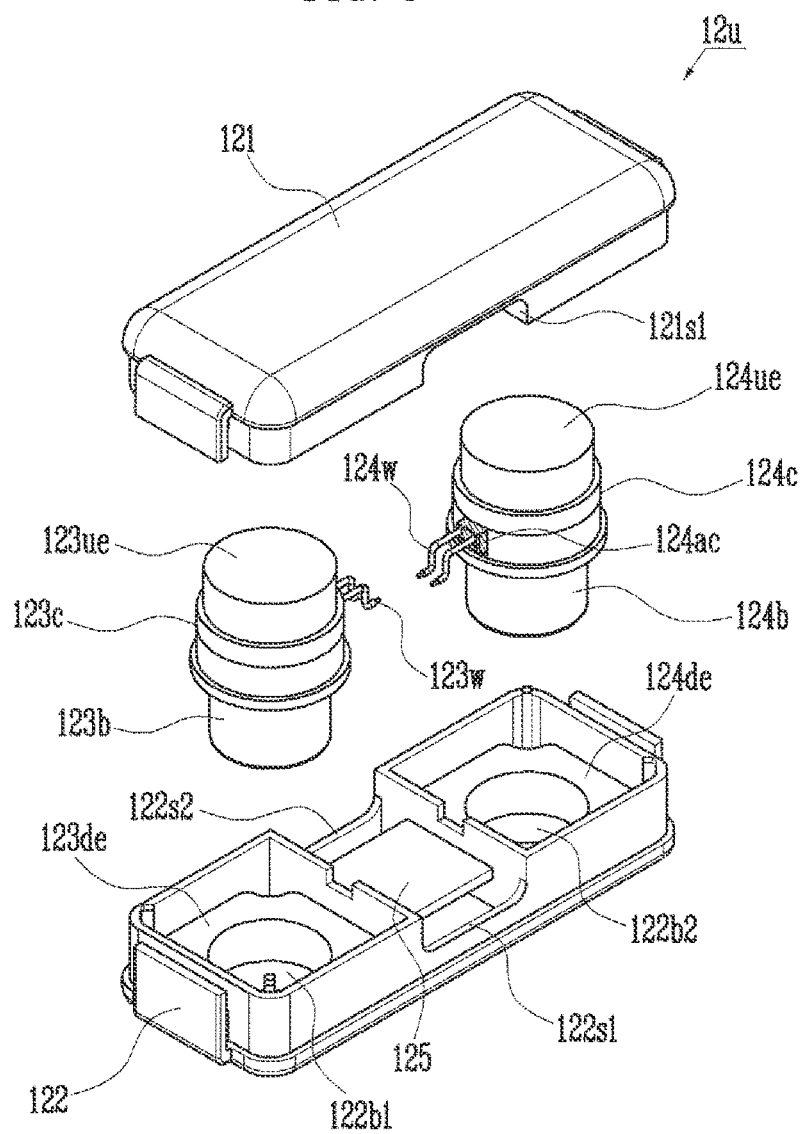
FIG. 3 is a view illustrating a module case according to the first embodiment of the present invention.
Figure 4:
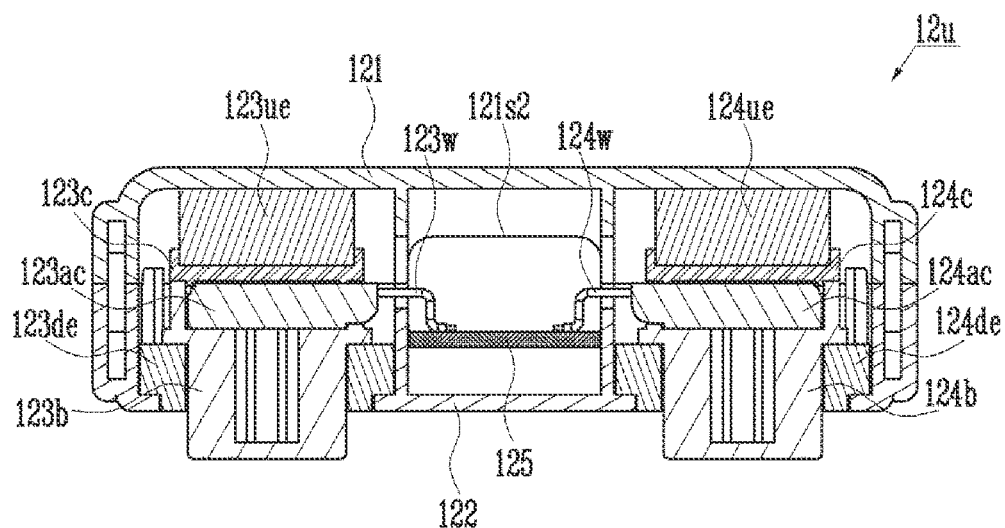
FIG. 4 is a view illustrating a section of the module case according to the first embodiment of the present invention.

FIG. 3 is a view illustrating a module case according to the first embodiment of the present invention. FIG. 4 is a view illustrating a section of the module case according to the first embodiment of the present invention.

Referring to FIGS. 3 and 4, the module case 12u according to the first embodiment of the present invention includes actuator cases respectively corresponding to two actuators 123ac and 124ac between an upper case 121 and a lower case 122. The two actuator cases may be disposed in the first direction d1.

The actuator cases include caps 123c and 124c that cover upper portions of the corresponding actuators 123ac and 124ac, and bases 123b and 124b that cover lower portions of the actuators 123ac and 124ac and are connected to the caps 123c and 124c to fix the actuators 123ac and 124ac, respectively.

The actuator cases may be made of a rigid material identical or different from that of the module case.

In the first embodiment, each of the bases 123b and 124b of the actuator cases may include an actuator accommodating space and a cylinder-shaped structure extending in the lower direction. The bases 123b and 124b may be exposed to the outside through openings 122b1 and 122b2 of the lower surface 122 of the module case 12u.

The bases 123b and 124b are adhered closely to the body 9 of the user, to perform a function of locally transferring vibrations of the actuators 123ac and 124ac to the body 9 of the user. As described above, the two bases 123b and 124b support the module case 12u, to be efficiently adhered closely to the body 9 of the user.

When the actuator cases are in direct contact with the upper surface 121 and the lower surface 122 of the module case 12u, noise may occur when the actuators 123ac and 124ac vibrate, and vibration power may be distributed to the whole of the module case 12u. It is very difficult to locally transfer the vibrations of the actuators 123ac and 124ac to the body 9 of the user.

Therefore, the tactile stimulation providing apparatus 10 according to the first embodiment of the present invention may further include elastic members 123ue, 123de, 124ue, and 124de. The caps 123c and 124c of the actuator case may be connected to the upper surface 121 of the corresponding module case 12u with the elastic members 123ue and 124ue interposed therebetween. In addition, the bases 123b and 124b of the actuator cases may be connected to the lower surface 122 of the corresponding module case 12u with the elastic members 123de and 124de interposed therebetween. The elastic members 123ue, 123de, 124ue, and 124de may be implemented using at least one member having elasticity, which includes sponge, rubber, spring, and the like.

The elastic members 123*ue*, 123*de*, 124*ue*, and 124*de* prevent the actuator cases from being in direct contact with the upper surface 121 and the lower surface 122 of the module case 12*u*, so that the vibrations of the actuators 123*ac* and 124*ac* can be effectively transferred to the body 9 of the user.

The shape of the elastic members 123*ue* and 124*ue* may correspond to the shape of the caps 123*c* and 124*c*. For example, in this embodiment, the elastic members 123*ue* and 124*ue* are in a cylindrical form, so that the elastic members 123*ue* and 124*ue* may be inserted into the upper accommodation space of the cap 123*c* and 124*c*, to be fixed.

The shape of the elastic members 123*de* and 124*de* may correspond to the shape of the caps 123*c* and 124*c*. For example, in this embodiment, the elastic members 123*de* and 124*de* may include openings into which the lower cylinder-shaped structures of the bases 123*b* and 124*b* can be inserted. The openings of the elastic members 123*de* and 124*de* may have a radius corresponding to the openings 122*b*1 and 122*b*2. Also, the outer shape of the elastic members 123*de* and 124*de* may be fitted corresponding to the shape of the lower case 122 of the module case 12*u*.

In this embodiment, the actuators 123*ac* and 124*ac* fixed by the caps 123*c* and 124*c* and the bases 123*b* and 124*b* may be a vibration motor that is one of electric actuators. Those skilled in the art may employ a pneumatic or hydraulic actuator as the actuators 123*ac* and 124*ac*. Therefore, one kind or plural kinds of actuators may be applied to the embodiment of the present invention.

The actuators 123*ac* and 124*ac* may be connected to a circuit unit 125 through wirings 123*w* and 124*w*. The circuit unit 125 may be implemented with a Printed Circuit Board (PCB), a Flexible Printed Circuit Board (FPCB), an Integrated Circuit (IC), or the like. A circuit unit provided in each module case may be connected to the above-described controller through the wiring passage. In another embodiment, each circuit unit may serve as an independent controller.

When two actuator cases are disposed in the first direction d1, the circuit unit 125 may be located between the two actuator cases in the first direction d1.

Also, the module case 12*u* may include side openings located in the second direction d2 orthogonal to the first direction d1. The side openings may be configured such that grooves 121*s*1 and 121*s*2 of the upper case 121 and grooves 122*s*1 and 122*s*2 of the lower case 122 are located to correspond to each other. The circuit unit 125 may be located between the two side openings.

Referring back to FIG. 1, the module cases 11*u*, 12*u*, 13*u*, 14*u*, 15*u*, and 16*u* of the first row may share the wiring passage UCP through the respective side openings. In addition, the module cases 11*d*, 12*d*, 13*d*, 14*d*, 15*d*, and 16*d* of the second row may share the wiring passage DCP through the respective side openings.

Figure 5:
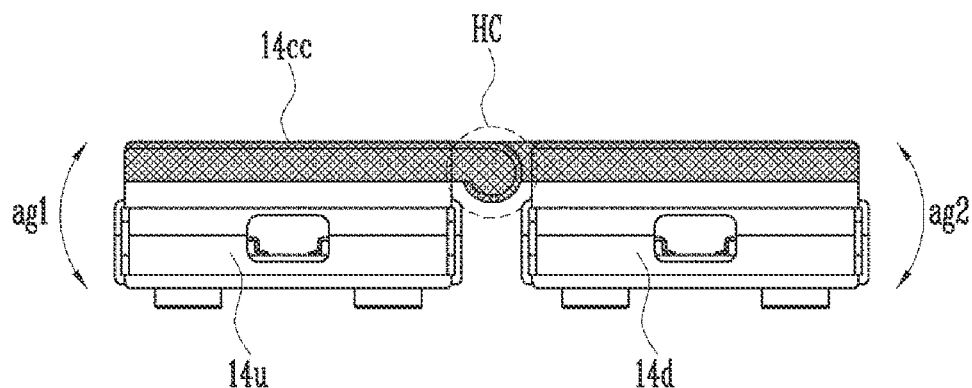
FIG. 5 is a view illustrating two main module cases according to the first embodiment of the present invention.

FIG. 5 is a view illustrating two main module cases according to the first embodiment of the present invention.

Referring to FIG. 5, arbitrary two module cases 14*u* and 14*d* may be main module cases. The module cases 14*u* and 14*d* that are the main module cases may include a controller case 14*cc* at the top thereof. In some embodiments, the main module cases and the controller case 14*cc* may be separately configured or be integrally configured.

The main module cases may be module cases connected to each other through the hinge HC. When the hinge HC is implemented, the hinge HC may be implemented in the module cases 14*u* and 14*d* or be implemented in the controller case 14*cc*.

As described above, the wiring passage in the first direction d1 may exist through the hinge HC, and driving of the plurality of actuators embedded in the module cases of the first and second rows may be controlled by one controller.

The module case 14*u* may be bent by an angle ag1 with respect to the module case 14*d* through the hinge HC. Similarly, the module case 14*d* may also be bent by an angle ag2 with respect to the module case 14*u* through the hinge HC.

Each of the angles ag1 and ag2 may be determined within a range of −5 degrees to +5 degrees. When the tactile stimulation providing apparatus 10 is worn, magnitudes of the angles ag1 and ag2 may be determined in real time according to the degree of winding of the body 9 of the user.

Figure 6:
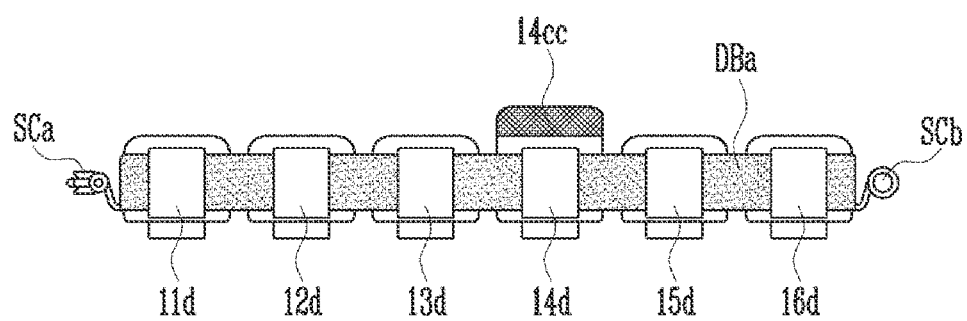
FIG. 6 is a view illustrating a disposition of a controller of the tactile stimulation providing apparatus according to the first embodiment of the present invention.

FIG. 6 is a view illustrating a disposition of the controller of the tactile stimulation providing apparatus according to the first embodiment of the present invention.

Referring to FIG. 6, the module case 14*d* that is the above-described main module case further includes the controller case 14*cc* at the top thereof. Although not shown, when the size of the controller case is insufficient, the module case 14*u* may also include the controller case. The above-described controller may be located in the form of a PCB, an FPCB, an IC, or the like at the inside of the controller case 14*cc*. In some embodiments, the controller may receive an actuator control command input through the existing wireless communication techniques including Bluetooth, Wi-Fi, and the like or through the existing wired communication techniques. The controller case 14*cc* may further include a battery therein.

Figure 7:
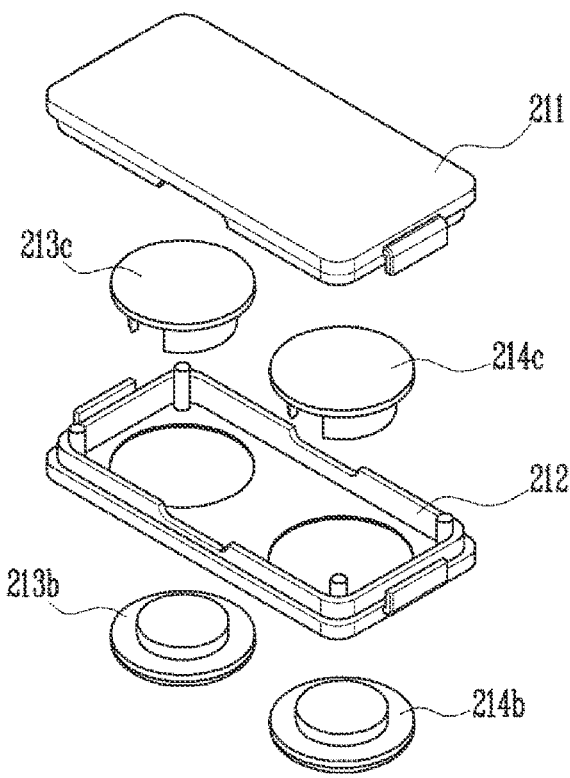
FIGS. 7 and 8 are views illustrating a module case according to a second embodiment of the present invention.
Figure 8:
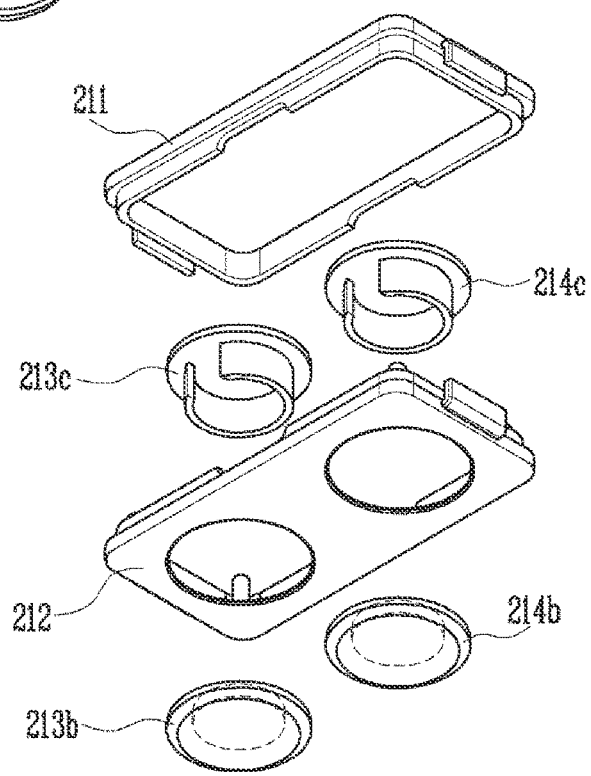

FIGS. 7 and 8 are views illustrating a module case according to a second embodiment of the present invention.

Referring to FIGS. 7 and 8, the module case and two actuator cases according to the second embodiment are illustrated. The module case includes an upper case 211 and a lower case 212, and the two actuator cases include caps 213*c* and 214*c* and bases 213*b* and 214*b*, respectively.

In the actuator cases of the second embodiment, each of the caps 213*c* and 214*c* includes an actuator accommodating space, and each of the bases 213*b* and 214*b* is configured to have a minimum size and thickness. Thus, actuators are located closer to the body of the user, and vibrations of the actuators can be better transferred to the body 9 of the user through the bases 213*b* and 214*b*.

Figure 9:
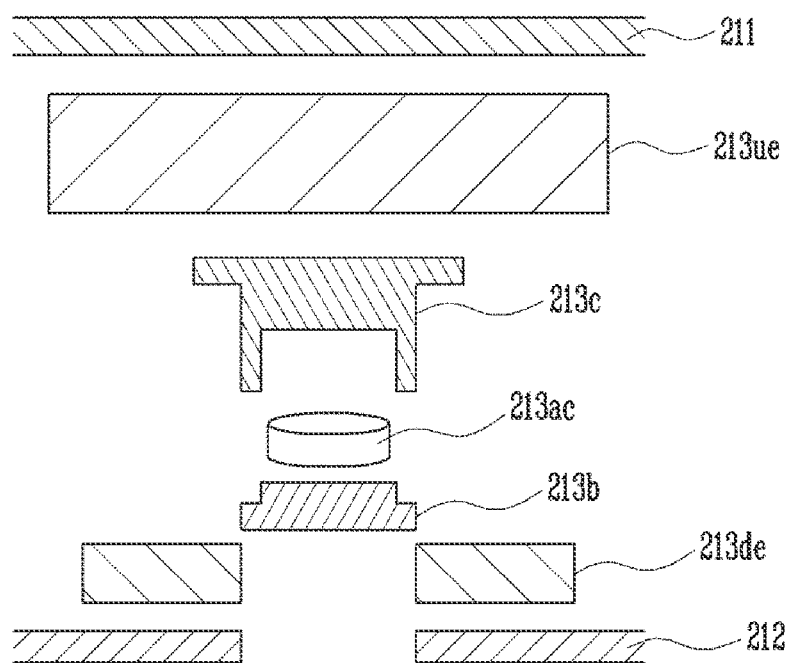
FIG. 9 is a view illustrating a partial section of the module case according to the second embodiment of the present invention.

FIG. 9 is a view illustrating a partial section of the module case according to the second embodiment of the present invention.

Referring to FIG. 9, there is illustrated a section when elastic members 213*ue* and 213*de* and an actuator 213*ac* are further included in the module case shown in FIGS. 7 and 8.

Unlike the first embodiment, in the second embodiment, the elastic member 213*ue* does not correspond to the cap 213*c* to be fitted to the shape of the cap 213*c*. The cap 213*c* may be put on an opening of the elastic member 213*de* through a protrusion part at an upper side thereof, and be fixed between the elastic member 213*de* and the elastic member 213*ue*.

The actuator 213*ac* and an electrical connection thereof are identical or similar to those described in the first embodiment, and therefore, their descriptions will be omitted.

Figure 10:
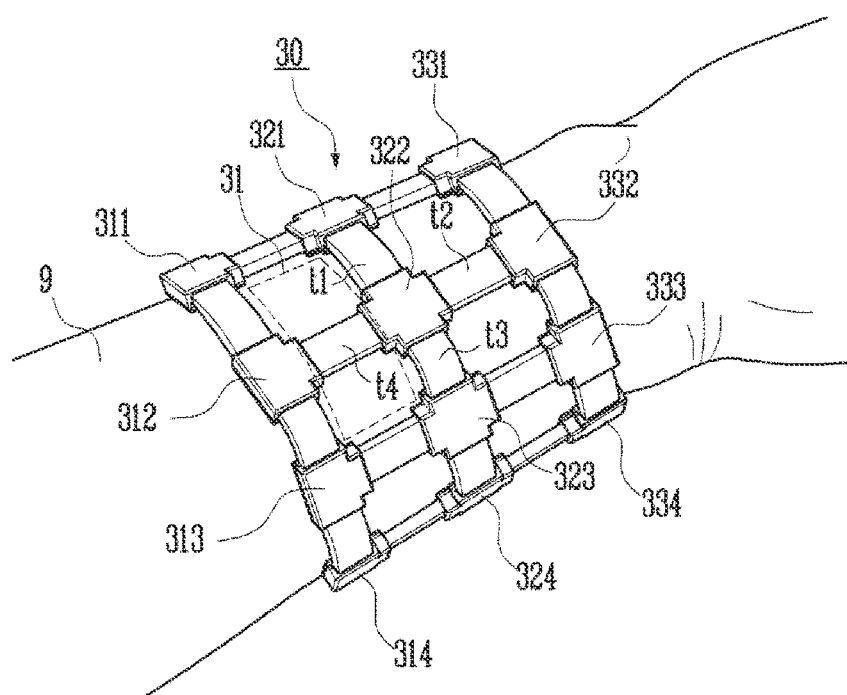
FIG. 10 is a view illustrating a tactile stimulation providing apparatus mounted around an arm of a user according to a third embodiment of the present invention.

FIG. 10 is a view illustrating a tactile stimulation providing apparatus mounted around an arm of a user according to a third embodiment of the present invention.

Referring to FIG. 10, the tactile stimulation providing apparatus 30 according to the third embodiment of the present invention a plurality of actuator cases 311, 312, 313, 314, 321, 322, 323, 324, 331, 332, and 333 and a plurality of tubes t1, t2, t3, and t4.

The tactile stimulation providing apparatus 30 may include a plurality of actuator cases arranged in a matrix form. For example, actuator cases 311, 312, 313, and 314 may constitute a first row, actuator cases 321, 322, 323, and 324 may constitute a second row, and actuator cases 331, 332, and 333 may constitute a third row.

Each of the actuator cases may include at least one insertion hole at a side thereof. For example, each of the actuator cases 311, 312, 313, and 314 constituting the first row may include three insertion holes including two insertion holes in the extension direction of the first row and one insertion hole in the direction in which the second row is located. In addition, each of the actuator cases 321, 322, 323, and 324 constituting the second row may include four insertion holes including two insertion holes in the extension direction of the second row, one insertion hole in the direction in which the first row is located, and one insertion hole in the direction in which the third row is located. In addition, each of the actuator cases 331, 332, and 333 constituting the third row may include three insertion holes including two insertion holes in the extension direction of the third row and one insertion hole in the direction in which the second row is located.

A corresponding tube is inserted and fixed to the insertion hole. Each actuator case may share the tube with an adjacent actuator case, to be connected to the adjacent actuator case.

For example, the actuator case 322 may share the tube t1 with the actuator case 321, to be connected to each other, share the tube t2 with the actuator case 332, to the connected to each other, share the tube t3 with the actuator case 323, to be connected to each other, and share the tube t4 with the actuator case 312, to be connected to each other.

The tactile stimulation providing apparatus 30 may further include a controller for controlling driving of a plurality of actuators. The controller may be electrically connected to the plurality of actuators through the plurality of tubes. That is, the controller may be electrically connected to the plurality of actuators through a wire, an FPCB, or the like, which is inserted into the plurality of tubes.

The controller may be located in a space on a plane, which is defined by at least four actuator cases. For example, the controller may be located in a space 31 on a plane, which has the actuator cases 321, 323, 313, and 311 respectively as vertices. Although not shown, a separate controller case for the controller may be provided in the space 31.

Figure 11:
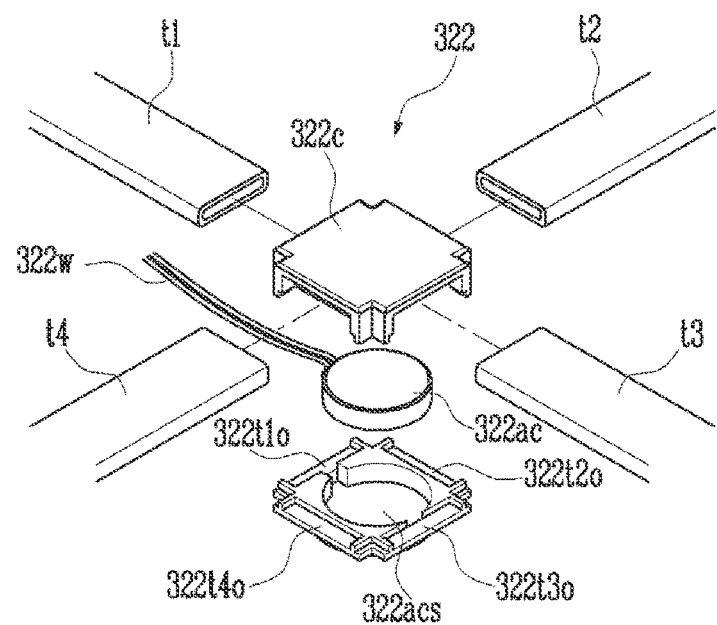
FIG. 11 is a view illustrating an actuator case according to the third embodiment of the present invention.

FIG. 11 is a view illustrating an actuator case according to the third embodiment of the present invention.

Referring to FIG. 11, the actuator case 322 among the plurality of actuator cases of FIG. 10 is exemplarily illustrated.

The actuator case 322 includes a cap 322c constituting an upper case and a base 322b constituting a lower case.

The base 322b may include an actuator accommodating space 322acs into which the actuator 322ac can be inserted.

The base 322b may include grooves 322t1o and 322t3o disposed in one direction and grooves 322t2o and 322t4o disposed in a direction orthogonal to the one direction. The grooves 322t1o, 322t2o, 322t3o, and 322t4o are matched to corresponding grooves of the cap 322c, to constitute insertion holes into which the tubes t1, t2, t3, and t4 are inserted, respectively.

Referring to FIG. 11, in the third embodiment, the groove 322t2o and 322t4o are disconnected from the actuator accommodating space 322acs, but the groove 322t1o and 322t3o may be connected to the actuator accommodating space 322acs. The disconnection and connection may be determined according to a predetermined wiring extension direction. As shown in FIG. 11, a wire 322w of the actuator 322ac and wires of the other actuators of the second row may be connected to the controller through the tubes t1 and t3.

In the third embodiment, the plurality of tubes t1, t2, t3, and t4 are not components configured integrally but may be individual components separate from each other. For example, the tube t1 is used only to connect the actuator case 322 and the actuator case 321, and may not be used to connect other actuator cases.

Each of the tubes t1, t2, t3, and t4 may be made of at least one material including silicon, rubber, plastic, metal, and the like.

Figure 12:
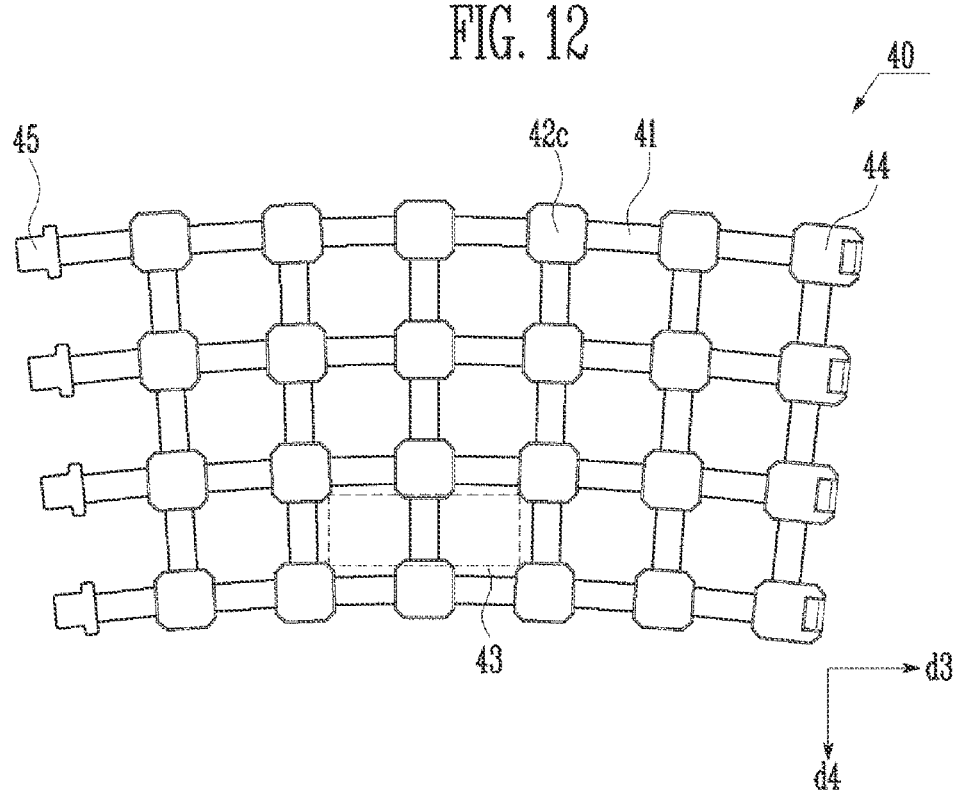
FIGS. 12 and 13 are views illustrating a tactile stimulation providing apparatus according to a fourth embodiment of the present invention.
Figure 13:
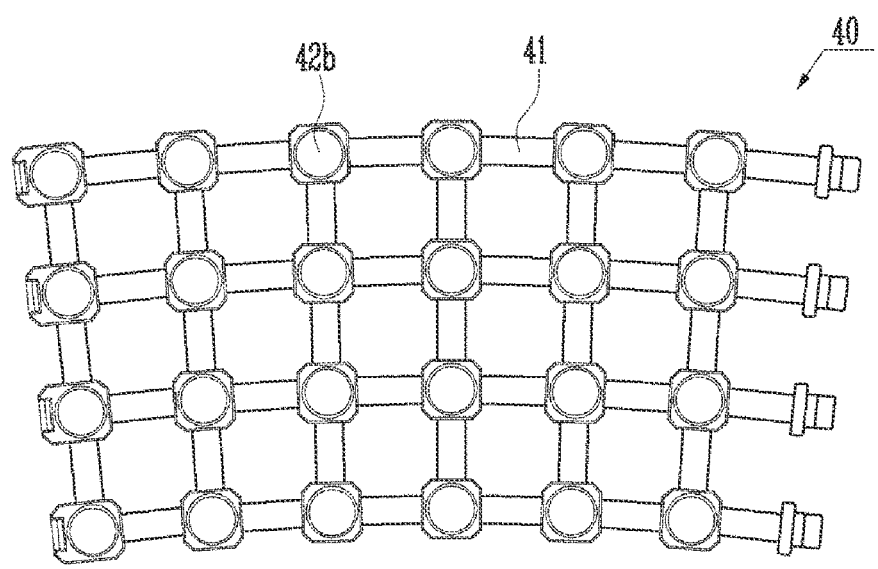

FIGS. 12 and 13 are views illustrating a tactile stimulation providing apparatus according to a fourth embodiment of the present invention.

Referring to FIGS. 12 and 13, the tactile stimulation providing apparatus according to the fourth embodiment of the present invention includes a grid-shaped tube structure 41 and a plurality of actuator cases engaged with the tube structure 41. The tube structure 41 may have a grid shape extending in a third direction d3 and a fourth direction d4 orthogonal to the third direction d3.

The tube structure 41 of the fourth embodiment is different from the tubes t1, t2, t3, and t4 of the third embodiment, which are separated from each other, in that the tube structure 41 is a structure in which all tubes are connected without assistance of the actuator cases. The tube structure 41 of the fourth embodiment may be integrally formed. In another embodiment, the tube structure 41 may be formed by forming a plurality of straight tubes extending for every row and a plurality of straight tubes extending for every column and then allowing the rows and columns to be engaged with each other, using grooves formed at grid intersection points.

Figure 14:
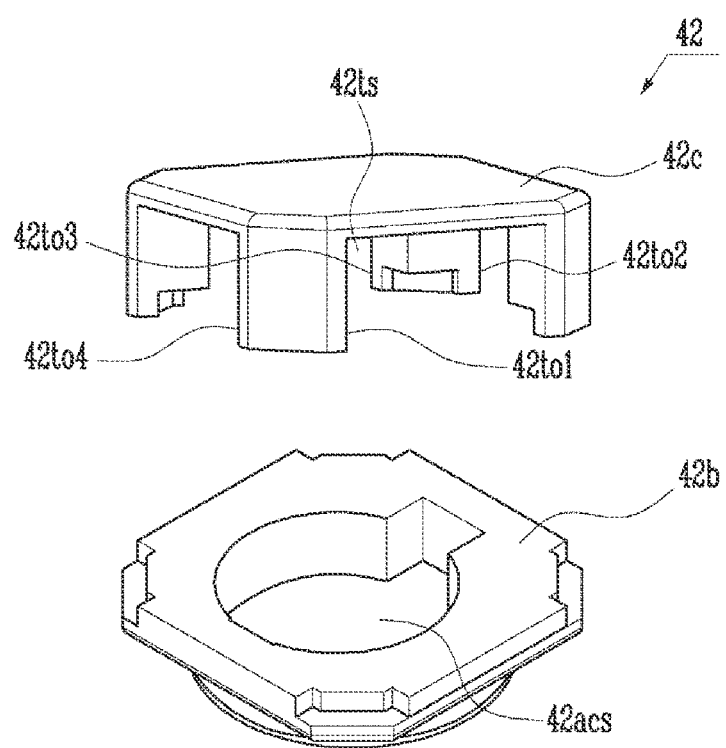
FIG. 14 is a view illustrating an actuator case according to the fourth embodiment of the present invention.

In the fourth embodiment, a cap 42c and a base 42 are vertically engaged with each other at a grid intersection point of the tube structure 41, so that an actuator case 42 of FIG. 14 can be fixed to the tube structure 41.

The tube structure 41 has a grid-shaped wiring passage therein, and therefore, the plurality of actuators may be connected to a controller through the wiring passage, using a wire, etc.

Like the third embodiment, in the fourth embodiment, the controller may be located in a space 43 on a plane, which is defined by at least four actuator cases.

Figure 17:
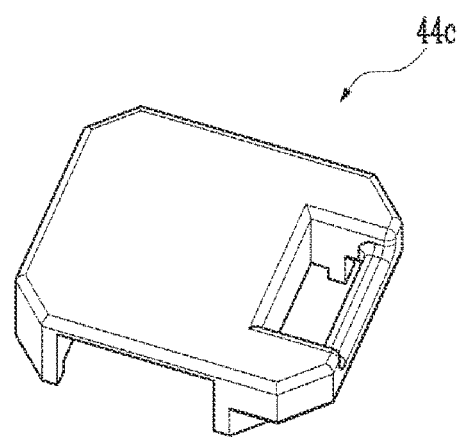
FIG. 17 is a view illustrating a ring-shaped actuator of FIG. 12.
Figure 18:
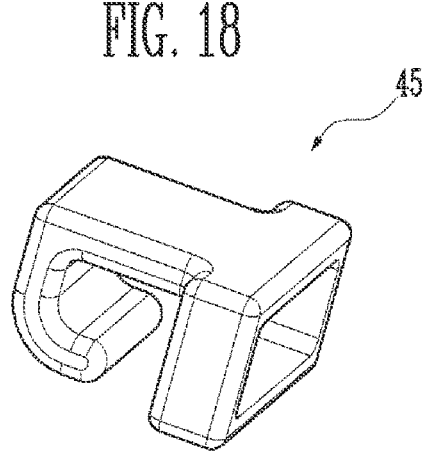
FIG. 18 is a view illustrating a hook part of FIG. 12.

The tactile stimulation providing apparatus 40 may include a hook part 45 disposed at one end thereof and a ring-shaped actuator case 44 disposed at the other end thereof (see FIGS. 17 and 18).

The ring-shaped actuator case 44 may have a base identical to that of other actuator cases, but a portion of a cap 44c of the ring-shaped actuator case 44 may include a ring part.

The hook part 45 is engaged with the ring part of the cap 44c of the ring-shaped actuator case 44, so that the tactile stimulation providing apparatus 40 can be fixed to a body of a user.

FIG. 14 is a view illustrating the actuator case according to the fourth embodiment of the present invention.

Referring to FIG. 14, the actuator case 42 includes a base 42b and a cap 42c. Specifically, the base 42b includes an actuator accommodating space 42acs. The cap 42c includes a tube accommodating space 42ts at the center thereof, and includes at least one insertion hole 42*to*1, 42*to*2, 42*to*3, and 42*to*4 connected to the tube accommodating space 42*ts* at a side thereof.

In the actuator case 42, the tube accommodating space 42*ts* and the insertion holes 42*to*1, 42*to*2, 42*to*3, and 42*to*4 are engaged with the tube structure 41 at a corresponding grid intersection point, so that the relative position of the actuator case 42 with respect to the tube structure 41 can be fixed.

An actuator is located in the actuator accommodating space 42*acs*, so that the position of the actuator can be fixed by the lower base 42*b* and the upper tube structure 41.

Figure 15:
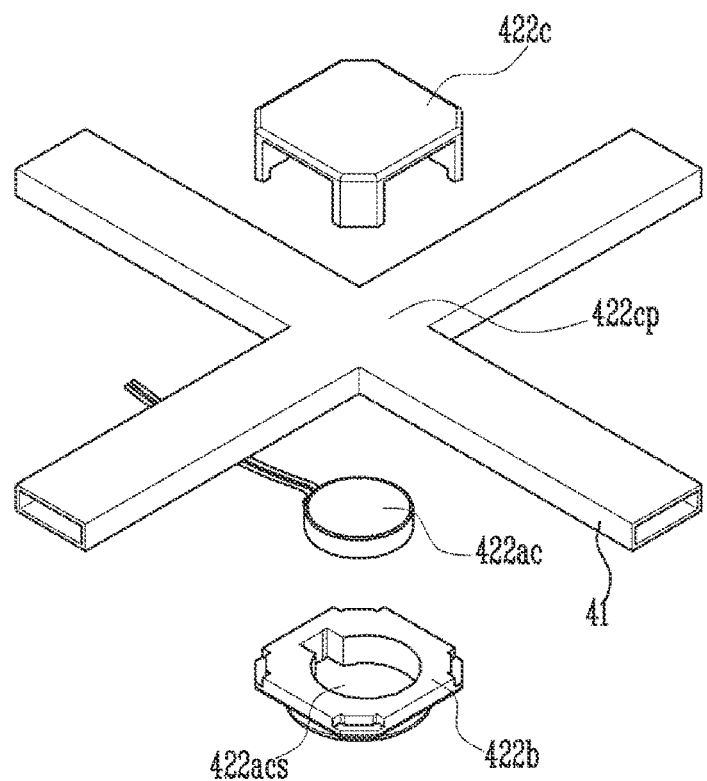
FIGS. 15 and 16 are views illustrating a coupling relationship between the actuator case and a tube structure according to the fourth embodiment of the present invention.
Figure 16:
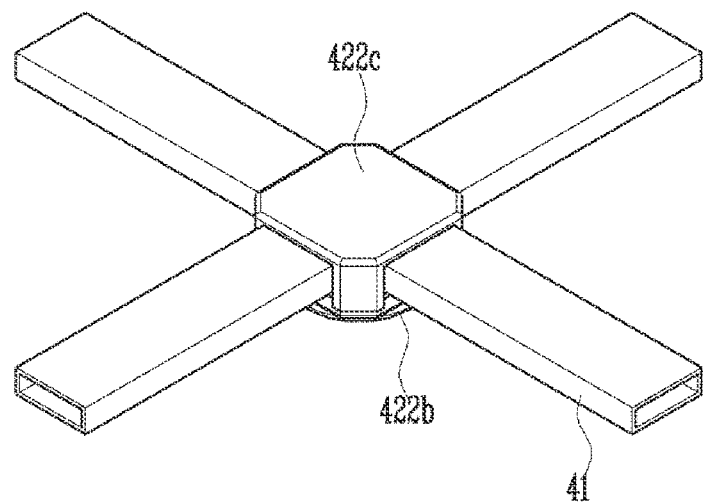

FIGS. 15 and 16 are views illustrating a coupling relationship between the actuator case and the tube structure according to the fourth embodiment of the present invention.

Referring to FIG. 15, a cap 422*c* and a base 422*b* are illustrated, which are engaged with each other at a grid intersection point 422*cp* of the tube structure 41 according to the fourth embodiment.

The base 422*b* may include an actuator accommodating space 422*acs* in which an actuator 422*ac* is to be accommodated.

The actuator 422*ac* may include a wire for power transfer and control. The wire may be connected to the controller through the tube structure 41. Although not shown, an opening through which the wire of the actuator 422*ac* can pass may be formed in a lower surface of the tube structure 41, which corresponds to the grid intersection point 422*cp*.

Referring to FIG. 16, it can be seen that the actuator cases 422*c* and 422*b* and the tube structure 41 are coupled to each other.

Although the present invention has been described with reference to exemplary embodiments illustrated in the drawings for illustrative purposes, those skilled in the art will appreciate that various modifications and equivalent embodiments are possible, without departing from the scope and spirit of the invention. Accordingly, the substantial technical protection scope of the present invention will be defined by the appended claims.

The invention claimed is:

1. A tactile stimulation providing apparatus comprising a plurality of actuators, a plurality of actuator cases respectively corresponding to the plurality of actuators, and a plurality of module cases each including at least one of the actuator cases,
   wherein each of the actuator cases includes:
   a cap covering an upper portion of a corresponding actuator; and
   a base covering a lower portion of the actuator, the base being connected to the cap to fix the actuator, and
   wherein the base is exposed to the outside through an opening formed in a lower surface of a corresponding module case.

2. The tactile stimulation providing apparatus of claim 1, wherein the cap is connected to an upper surface of the corresponding module case with a first elastic member interposed therebetween, and
   the base is connected to the lower surface of the corresponding module case with a second elastic member interposed therebetween.

3. The tactile stimulation providing apparatus of claim 1, wherein each of the module cases includes two of the actuator cases, which are disposed in a first direction.

4. The tactile stimulation providing apparatus of claim 3, wherein each of the module cases includes at least one side opening disposed in a second direction different from the first direction.

5. The tactile stimulation providing apparatus of claim 4, wherein each of the module cases includes a first wiring passage extending in the second direction through the side opening, and
   wherein the module case shares the first wiring passage with an adjacent module case, to be connected to the adjacent module case.

6. The tactile stimulation providing apparatus of claim 5, further comprising a controller for controlling driving of the plurality of actuators,
   wherein the controller is electrically connected to the plurality of actuators through the first wiring passage.

7. The tactile stimulation providing apparatus of claim 6, wherein two module cases among the plurality of module cases are connected to each other by sharing a second wiring passage extending in the first direction.

8. The tactile stimulation providing apparatus of claim 7, wherein the two module cases are connected to each other through a hinge.

9. The tactile stimulation providing apparatus of claim 8, wherein the plurality of module cases includes a first row of module cases arranged in the second direction and a second row of module cases arranged in the second direction.

10. The tactile stimulation providing apparatus of claim 9, wherein one of the two module cases connected through the hinge is one of the first row of module cases, and
    wherein the other of the two module cases connected through the hinge is one of the second row of module cases.

11. The tactile stimulation providing apparatus of claim 10, further comprising a controller case including the controller,
    wherein the controller case is disposed at a top of at least one of the two module cases connected through the hinge.

12. The tactile stimulation providing apparatus of claim 5, wherein each of the module cases includes at least one band extending in the second direction, and
    wherein the band flexibly connects adjacent module cases.

13. The tactile stimulation providing apparatus of claim 12, wherein a length of the first wiring passage is longer than a length of the band.

14. The tactile stimulation providing apparatus of claim 13, wherein the first wiring passage is in a shape having a plurality of wrinkles.

* * * * *